United States Patent [19]
Witherspoon

[11] Patent Number: 5,457,731
[45] Date of Patent: Oct. 10, 1995

[54] EMERGENCY TELECOMMUNICATIONS DEVICE FOR THE DISABLED

[76] Inventor: Joe H. Witherspoon, 5625 S. 93rd E. Ave., Tulsa, Okla. 74145

[21] Appl. No.: 131,451
[22] Filed: Oct. 4, 1993
[51] Int. Cl.$^6$ .................................. H04M 11/00
[52] U.S. Cl. ........................ 379/52; 379/96; 379/97
[58] Field of Search .................. 379/52, 96–99, 379/93, 444; 340/825.19

[56] References Cited

U.S. PATENT DOCUMENTS

| | | | |
|---|---|---|---|
| 3,896,267 | 7/1975 | Sachs et al. | 379/52 |
| 4,012,599 | 3/1977 | Meyer . | |
| 4,075,621 | 2/1978 | Salmon | 340/337 |
| 4,191,854 | 3/1980 | Coles . | |
| 4,268,721 | 5/1981 | Nielson . | |
| 4,471,165 | 9/1984 | DeFino et al. | 379/96 |
| 4,492,820 | 1/1985 | Kennard . | |
| 4,650,927 | 3/1987 | James | 379/96 |
| 4,689,811 | 8/1987 | Lennstrom | 379/38 |
| 4,754,474 | 6/1988 | Feinson | 379/96 |
| 4,777,469 | 10/1988 | Engelke | 379/96 |
| 4,918,721 | 4/1990 | Hashimoto | 379/96 |
| 4,959,847 | 9/1990 | Engelke | 375/121 |
| 5,081,673 | 1/1992 | Engelke et al. | 379/52 |
| 5,086,450 | 2/1992 | Kitagawa et al. | 379/40 |
| 5,163,081 | 11/1992 | Wycherley et al. | 379/52 |
| 5,253,285 | 10/1993 | Alheim | 379/52 |

Primary Examiner—Wing F. Chan
Attorney, Agent, or Firm—Frank J. Catalano; Scott R. Zingerman

[57] ABSTRACT

An emergency telecommunication system for the hearing or speech impaired includes an interface electrically connecting the emergency system to a telephone communication system, a programmable gate array, a keyboard connected to the programmable gate array, a register connected to the programmable gate array for storing at least one telephone number of the telephone communication system, and a graphic display device connected to the programmable gate array and to the register. The system also includes devices for receiving and transmitting signals in ASCII format, Baudot format, and DTMF signals, and for receiving and transmitting normal voice communications simultaneously with one of the ASCII and Baudot format and DTMF signals. Switches selectively connect each of the receiving and transmitting devices in independent receiving and transmitting modes between the interface and the programmable gate array. A computer connected between the interface and the programmable gate array detects incoming signals to the interface, distinguishes whether the incoming signals are in ASCII format, Baudot format or audio tone and connects the receiving mode of one of the receiving and transmitting devices corresponding to the distinguished signal between the interface and the programmable gate array. The computer further permits variation of the volume of the audio tone signals and display of a visual message corresponding to the incoming signal. At least one outgoing message is transmittable to a telephone number stored in the register.

20 Claims, 4 Drawing Sheets

EMERGENCY TELECOMMUNICATIONS DEVICE FOR THE DISABLED

BACKGROUND OF THE INVENTION

This invention relates generally to telecommunications devices and more particularly concerns emergency telecommunications devices for the disabled.

Approximately 22 million Americans have some type of hearing impairment. An additional 3 million persons are speech impaired. Still, only 200,000 Telecommunications Devices for the Deaf (TDDs) are in use. Inherent technological, economic and physical limitations have severely limited the dissemination, availability and use of TDDs by the general public, public businesses and prospective employers. The initial expense and the costs of repair are high. The requirement for mirror facilities (identical or mutually compatible transmission and reception facilities) also limits the use of TDDs to the impaired community. Furthermore, the electronics of a TDD use the Baudot communications format which was originally developed for mechanical teletypewriters and is inadequate for present-day communications. Moreover, Baudot is generally incompatible with other systems.

An alternative to the TDD is the modem-equipped personal computer (PC/M), which uses the much faster ASCII communications format. PC/Ms have enjoyed a much wider distribution than TDD's due to their versatility, which to some degree offsets their much higher cost. Nevertheless, like the TDD, the PC/M requires mirror facilities, awkward startup protocols and highly specialized and expensive maintenance costs.

TDDs and PC/Ms are mutually incompatible and are nearly useless in a public access situation. Normal use by the general public exposes a TDD, PC/M or similar device, to extraordinary wear and tear. Furthermore, if the device is not armored, it becomes a target for vandalism or theft.

Building owners and elevator manufacturers have avoided placing either TDDs or computers in elevators to aid communications with the disabled due to initial expense, the cost of installing this equipment, the maintenance requirements, and the difficulty of mounting a typewriter-keyboard at a convenient height in the elevator. In addition, building owners face the expense of providing compatible systems at several locations within the building, i.e., in the lobby for emergency personnel, in the maintenance office and in the managers office. Despite the cost involved, however, all of the 500,000 public elevators located in the U.S. are now required to modify their existing emergency intercommunications systems to allow nonverbal communication with persons having a communicative disability.

Before the passage of the Americans with Disabilities Act, the emergency response services comprises made no provision to answer any telephone summons not made orally. Since passage of the ADA, provision has been made by these companies for an emergency call, initiated by a TDD or PC/M, to be rerouted to a local relay service which then summons aid. In addition, all states have now provided for compliance with the requirements of the Act to provide access to public communications for persons with a communicative disability. However, the disabled person must still provide compatible facilities.

It is, therefore, an object of this invention to provide an emergency telecommunications device for the disabled which will increase the access of the impaired community to society and society's access to the impaired community. Another object of this invention is to provide an emergency telecommunications device for the disabled which eliminates the need for oral communications. A further object of this invention is to provide an emergency telecommunications device for the disabled which is easily installed on, and makes use of, existing communications systems. It is also an object of this invention to provide an emergency telecommunications device for the disabled which facilitates emergency communications by permitting external access and activation of the communications device by TDD or PC/M or telephone. Yet another object of this invention is to provide an emergency telecommunications device for the disabled which eliminates the need for mirror facilities, as well as the specialized and costly maintenance requirements of TDDs and PC/Ms. Furthermore, it is an object of this invention to provide an emergency telecommunications device for the disabled which facilitates prior storage of messages and information (i.e. emergency, room service or maintenance) so as to ease and accelerate the use of the device by the disabled. It is also an object of this invention to provide an emergency telecommunications device for the disabled which, in elevator applications, permits two-way communication for the interchange of emergency information, with a communications point outside the hoistway. And it is an object of this invention to provide an emergency telecommunications device for the disabled which minimizes wear, tear, theft and vandalism to the device.

SUMMARY OF THE INVENTION

In accordance with the invention, an emergency telecommunications device for the disabled is provided which, utilizing a telephone keypad and a public telephone equipped with this device, can access and communicate with any similarly equipped telephone or with any TDD or PC/M.

The device can likewise communicate graphically with any regular telephone and can access or be accessed by a normal telephone which, utilizing a standard key pad, can send a message to the telephone equipped with the device which is then displayed on an LCD. The device user can then reply orally, if able, or in code.

The device, with integral LCD, can replace an elevator phone or can be mounted in-line behind the elevator telephone either as a replacement for the phone base plate or as a separate unit.

In addition, an inexpensive ultrasonic broadcaster/receiver unit will enable the device to be used to replace the costly monitoring services now available for senior citizens through Medicare.

Provision of a customer inscribed code number renders the device useless for resale. Therefore, theft is not a problem as in the case of TDDs and PC/Ms.

The emergency system has an interface electrically connected to a telephone communication system and to a computer which is connected to a programmable gate array. A keyboard, a register and a LCD are also connected to the programmable gate array. The register stores at least one telephone number of the telephone communication system. The LCD is also connected to the register. Devices for receiving and transmitting signals in ASCII format in Baudot format and in DTMF tone are selectively switched in independent receiving and transmitting modes into and out of connection between the interface and the programmable gate array.

The computer permits detection of incoming signals to the interface and distinguish as to whether the incoming signals are in ASCII format, Baudot format or DTMF tone. It then connects the receiving mode of one of receiving and transmitting devices corresponding to the distinguished signal between the interface and the programmable gate array to permit reception of the incoming signal. The computer further permits variation of the volume of the audio tone signal in response to operation of a selected pad on the keyboard, as well as display on the LCD a visual message corresponding to the incoming signal. The register also stores at least one outgoing message in electronic form and in DTMF tone and the computer initiates address of at least one telephone number stored in the register in response to operation of another selected pad of the keyboard. The computer then initiates transmission of the message in electronic form and DTMF tone in response to operation of selected third and fourth pads of the keyboard to a telephone number responding to the address.

The electronic and audio messages stored in the register can be changed by operation of the keyboard or a telephone connected to the audio tone receiving and transmitting device. The system further permits alpha numeric display by the LCD of signals received at the interface by operation of keyboards in the telephone system.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
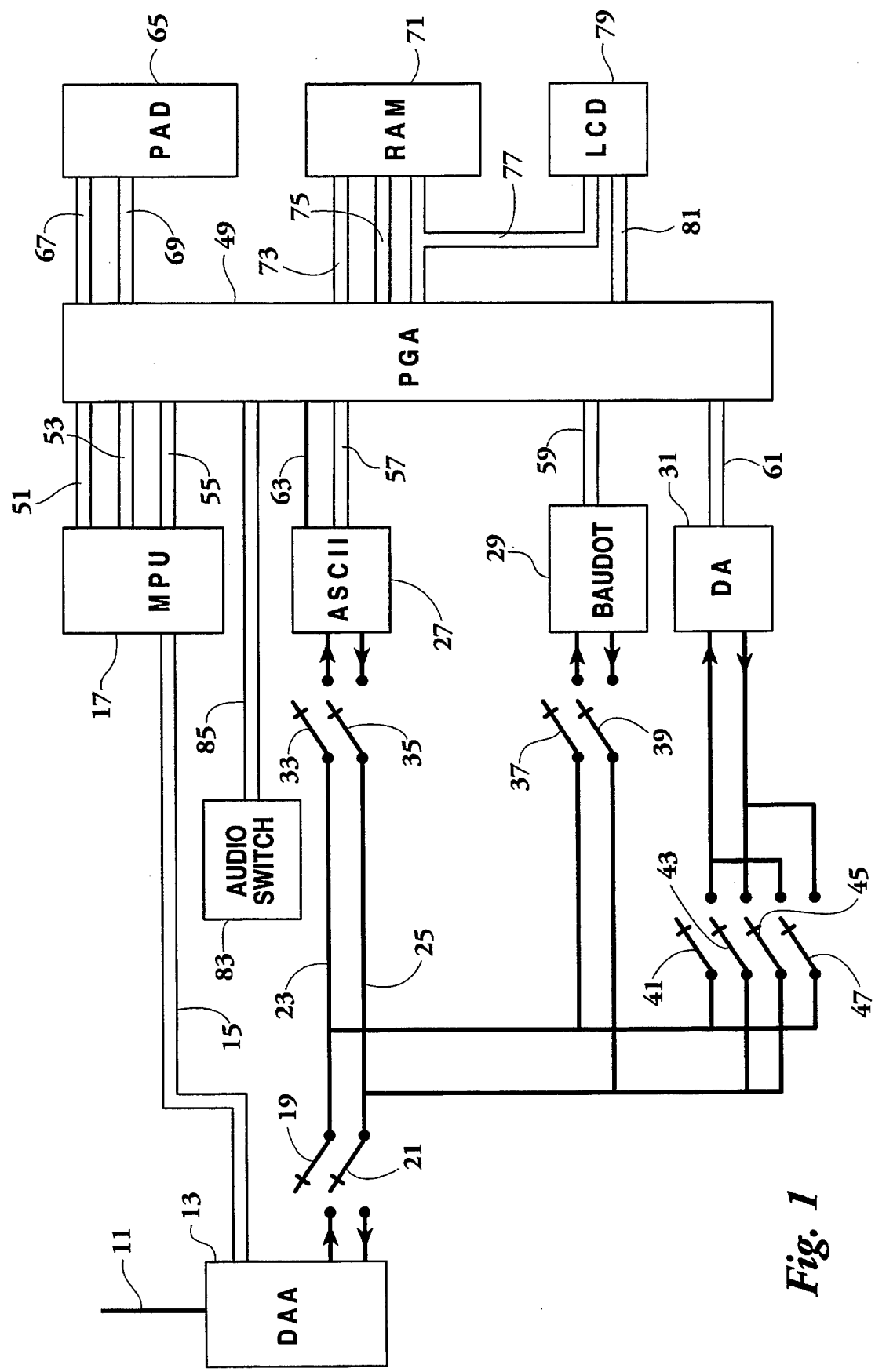
FIG. 1 is a block diagram of the emergency telecommunications device for the disabled.

Turning first to FIG. 1, a telephone line 11 into the emergency telecommunications system is connected to a data access arrangement interface 13, which is in turn connected by a control bus 15 to a microprocessor 17. The data access arrangement interface 13 is also connected through independently operated switches 19 and 21 in receive and transmit lines 23 and 25 to an ASCII modem 27, a Baudot modem 29 and a dual tone modulation frequency or DTMF digital audio play/record unit 31. The receive and transmit lines 23 and 25 are also independently switched by switches 33 and 35 at the ASCII modem 27, switches 37 and 39 at the Baudot modem 29 and two pairs of switches 41 and 43 and 45 and 57 at the digital audio unit 31. The microprocessor 17 is connected to a programmable gate array 49 by address 51, data 53 and control 55 buses. The ASCII modem 27, the Baudot modem 29 and the digital audio unit 31 (consisting of a CODEC and a verbal chip) are also connected to the programmable gate array 49 by control buses 57, 59 and 61. The ASCI modem 27 is further connected to the programmable gate array 49 by a receive and transmit line 63. Any type of key pad, custom or standard, such as a keyboard 65 is connected to the programmable gate array 49 by a row bus 67 and a column bus 69. Preferably, the keyboard 65 will be an 8 by 8 configuration providing 64 keys. Nonvolatile random access memory (RAM) 71 is connected to the programmable gate array 49 by a RAM control bus 73, an address bus 75 and a data bus 77, the data bus 77 being further connecting on LCD 79 between the programmable gate array 49 and the RAM 71. The LCD 79 is also connected to the programmable gate array 49 by the LCD control bus 81. A switching device 83 connected to the programmable gate array 49 by a control bus 85 permits automatic control of the switches 19, 21, 33, 35, 37, 39, 41, 43, 45 and 47 between the interface 13 and the modems 27 and 29 and the audio unit 31.

Figure 2:
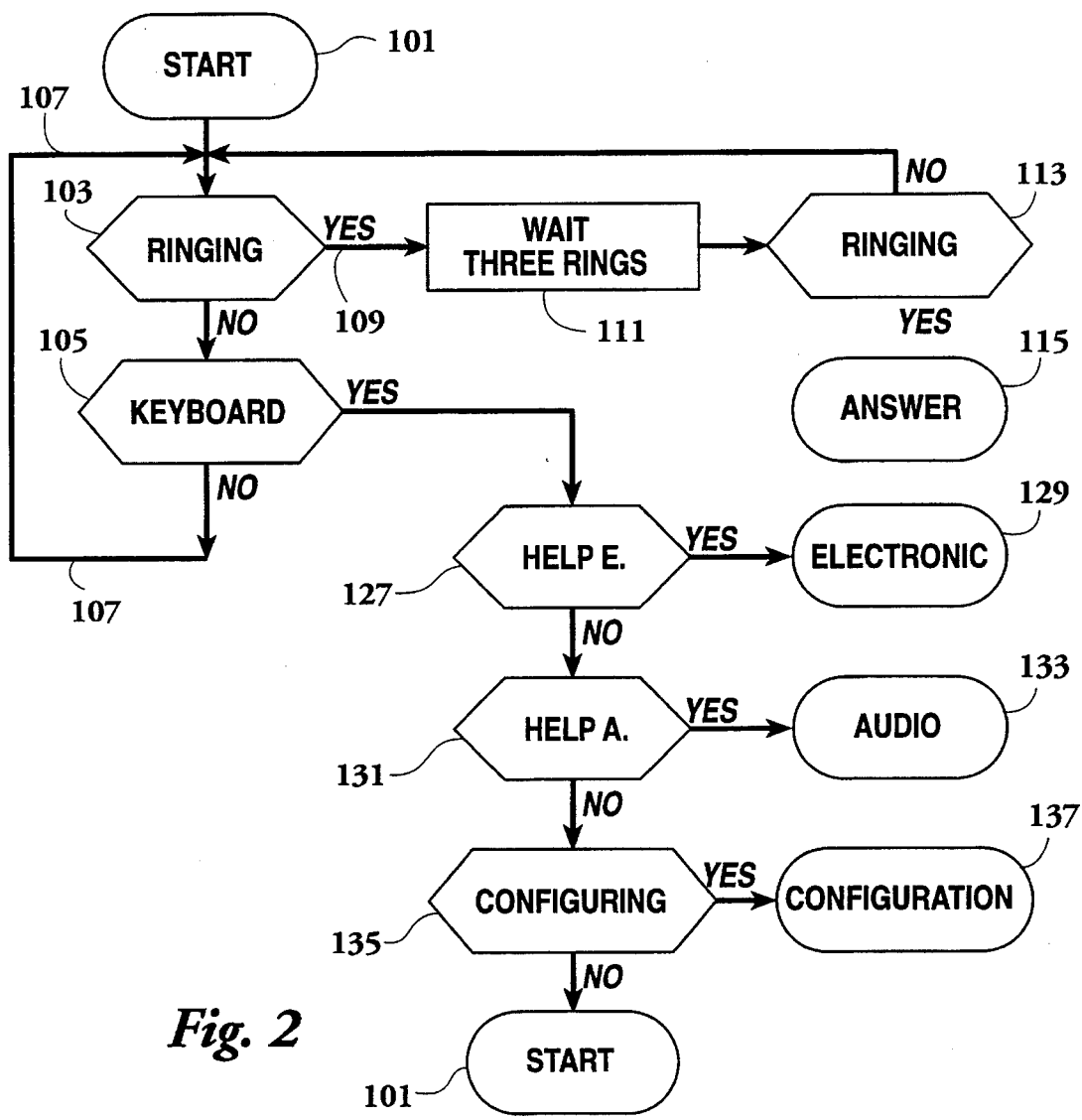
FIG. 2 is a flow chart illustrating the basic interrogation process of the emergency telecommunications device for the disabled.
Figure 3:
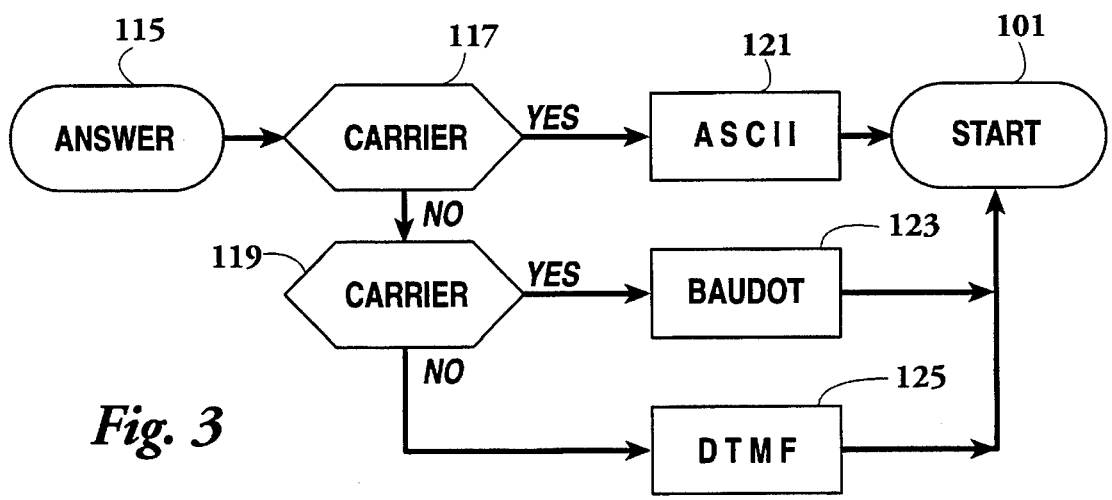
FIG. 3 is a flow chart illustrating the interrogation process of the answer loop of the emergency telecommunications device for the disabled.

The operation of the device can be understood in reference to FIGS. 2 through 6. The device constantly searches in a signal seeking loop for the existence of ringing or a keyboard command. As shown in FIG. 2 from the start position 101, the device first inquires at step 103 as to the existence of ringing. If there is no ringing or incoming signal, the device then inquires at step 105 as to the existence of a keyboard command or outgoing signal. If no outgoing signal exists, the search loop 107 is repeated until either ringing or a keyboard command is identified.

If ringing is detected, routing transfers from the send loop 107 to an answer loop 109 which, at step 111, first ascertains if ringing continues for a preselected number of rings. If the user answers before the selected number of rings are completed, normal operation of the phone ensues. If the selected number of rings are detected, routing continues through the next step 113 in the answer loop 109. At step 113, if ringing has ceased, routing returns to the search loop 107. If ringing continues, routing passes to the answer sequence 115 illustrated in FIG. 3. In the answer sequence 115, the device determines at steps 117 and 119 if the incoming signal is ASCII, Baudot or Dual Tone Modulation Frequency DTMF. If the signal is ASCII, the answer sequence 115 continues to the proper ASCII modem 121. If the signal is not ASCII, routing continues to the Baudot loop. If the signal is Baudot, routing continues through the appropriate Baudot modem 123. If the signal is not Baudot, routing continues through the Dual Tone Modulation Frequency or DTMF loop 125. In any loop, when the incoming message has been received, the device returns to the start condition 101 and searches for additional incoming or outgoing messages. If the incoming message is a voice message, the volume and amplification of the voice signal is controlled by the elevator occupant by use of a designated button on the telephone key pad 65.

If the search indicates at step 105 the existence of a keyboard command, the device further searches to determine whether the outgoing signal is to be an electronic or audio communication. As shown, if electronic communication is selected at step 127, the routing passes to the electronic communications loop 129. If not, the routing is then passed on to determine at step 131 if audio communication is desired. If so, routing continues through the audio communication loop 133. If not, the routing continues on to step 135 to determine if the keyboard command is for the purpose of configuring the outgoing message operation. If so, routing continues through the configuration loop 137. If not, the device returns to the start condition 101 and continues its search for ringing or keyboard commands.

Figure 4:
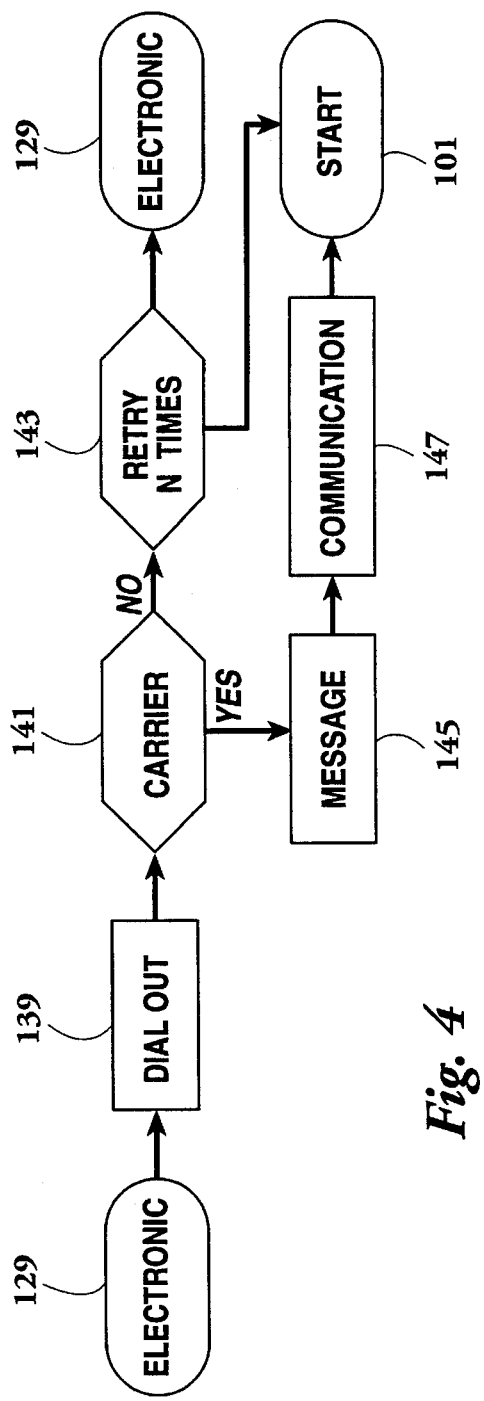
FIG. 4 is a flow chart illustrating the interrogation process of the electronic connection loop of the emergency telecommunications device for the disabled.

If the electronic message routing 129 has been selected, as shown in FIG. 4, the device will initiate a sequence of outgoing calls 139 to numbers designated via the configuration loop 137. If the dialing sequence 139 finds no carrier present at step 141 to receive the message, the dial out sequence is repeated at step 143 a preselected number of times N. If, after N tries, no carrier has been found the device returns to the start condition 101. If a carrier is found, the device returns to the electronic communications loop 129 for redetermination as to the existence of the presence of the carrier. If the response to the inquiry as to a carrier being present is yes at step 141, the signal is routed through a send help message loop 145 which sends the designated message. At step 147 two-way communication is established until discontinued by operation of specified key pads on the keyboard or telephone key pad which end communication and clears the phone line.

Figure 5:
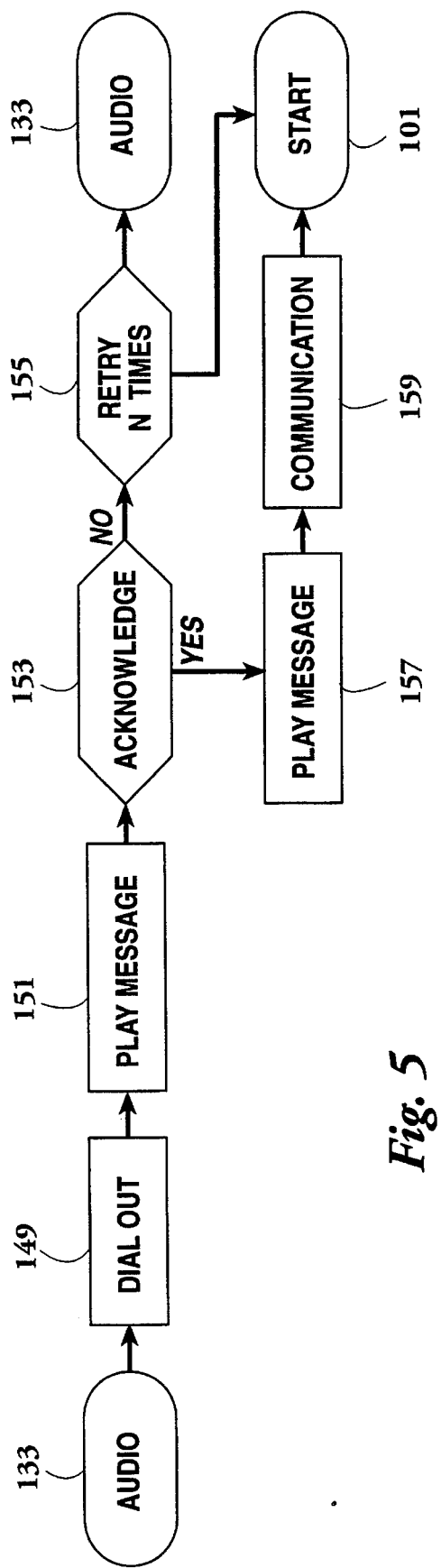
FIG. 5 is a flow chart illustrating the interrogation process of the audio connection loop of the emergency telecommunications device for the disabled.

If the audio message routing 133 has been selected, as shown in FIG. 5, the device will initiate a sequence 149 of outgoing calls to numbers designated by means of the configuration loop 137. A preselected message is transmitted at step 151 to the dialed number or numbers. If the message is not acknowledged at step 153, the sequence is repeated 155 a preselected number of times N. If, after N tries, the message is not acknowledged, the device returns to the start condition 101. If the message is acknowledged, the device returns to the audio loop 133 to be repeated. If the message is acknowledged at step 153, the signal is routed through a send help message loop 157 which sends the designated message. At step 159, two-way communication is established until discontinued by operation of specified key pads on the keyboard or telephone key pad which ends communication and clears the phone line.

Figure 6:
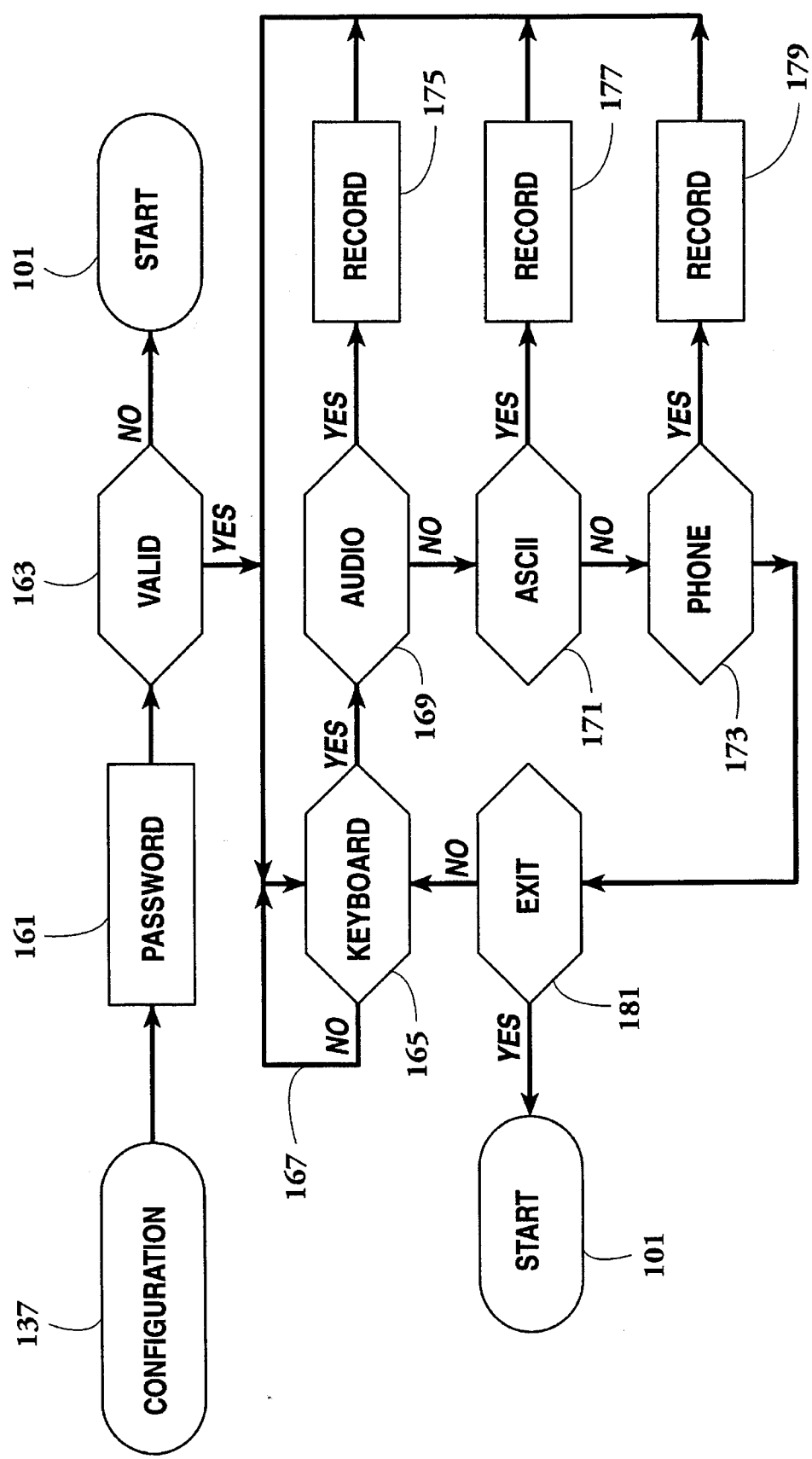
FIG. 6 is a flow chart illustrating the interrogation process of the configuration loop of the emergency telecommunications device for the disabled.

If neither electronic or audio help is being sought, the device will continue to determine whether configuration is desired. If configuration is not desired, routing will return to the start condition 101. If configuration is desired, routing continues through the configuration path 137 as shown in FIG. 6, which may include entry of a password 161 via the keyboard 65 and a comparison 163 by the device to determine whether or not the entered password 161 is valid. If the password is not valid, the routing would return from step 163 to the start condition 101. If the password is valid, then routing continues to a keyboard command decision 165. If no keyboard command existed, then routing would continue in a loop 167 to search for such a command. When the keyboard command is present, routing continues in the configuration loop to determine sequentially whether configuration is desired in the audio 169, ASCII 171 or telephone 173 mode. If configuration is to occur in the audio mode 164, then the desired message would be recorded via the audio hand set 175. If the configuration is to occur in the ASCII 171 mode, then the recorded message would be recorded via the keyboard 177. If the keyboard command related to the configuration of phone numbers to be dialed out in the electronic 129 or audio 133 modes, the number sequence 179 could then be entered via the keyboard. If neither the audio 169, ASCII 171 or phone 173 configuration are indicated, the loop continues to an exit decision 181. If the configuration routing was to terminate, the device would then return to the start condition 101. If, however, the configuration routing was intended to be continued, the device would return to the keyboard command condition 165 for further processing. After recording any information in either the audio 169, ASCII 171 or telephone number 173 portions of the configuration loop 137, the device returns to the keyboard command decision 105 to see if further commands are to be executed. If not, the device would return to the start position 101.

The system is arranged to allow normal voice communications to take place over the normal telephone apparatus but further provides for control of the volume and amplification of the voice signal by use of the telephone keypad 65. By pressing and holding down a preselected key on the pad 65, the amplification can be varied to the desired level. Three separate pre-enscribed emergency messages, such as medical, police and general emergency messages, can be transmitted in three different modes including oral, via a voice recording stored on a chip in the non-volatile RAM, TDD or Baudot and computer or ASCII format. That is, by pressing the appropriate key or keys on the pad 65, the message to be transmitted can be selected. As many as six customer enscribed telephone numbers can be programmed into the device for consecutive or alternative dialing, as desired by the owner. Messages can be encoded and transmitted in either TDD or computer format by use of the keypad 65 and the alpha numeric LCD display 79. The LCD 79 is used to display the system, such as "acknowledged", "dialing", "busy" or "dialing next number" or the message, for example, with incoming messages in capitals and outgoing messages in lower case. Two way communication can be established with any TDD or computer or any telephone compatible with the subject device. Moreover, one-way graphic communication can be established by any telephone regardless of whether that phone is equipped with the present device. Oral reply is possible by the user of the device, even in response to a graphically transmitted message. When the device is accessed and activated by an external computer, TDD or telephone, it can be utilized to initiate visual and audio alarms or to communicate special instructions.

In one tested embodiment of the device, the components are as follows:

| NUMBER | DEVICE | IDENTIFICATION |
| --- | --- | --- |
| 13 | DAA | DALLAS SEMICONDUCTOR 2249 |
| 17 | MPU | INTEL 8751 |
| 27 | ASCII MODEM | NATIONAL SEMICONDUCTOR 74HC942 |
| 29 | TDD MODEM | |
| 31 | DA | CODEC HITACHI HD44238 AND VERBAL CHIP DALLAS SEMI-CONDUCTOR 2130 |
| 49 | PGA | XILINX 3042 |
| 65 | PAD | TYPICAL ROW/COLUMN PASSIVE KEYPAD |
| 71 | RAM | TWO 1Mbit STANDARD RAMS |
| 79 | LCD | AND741A (8 ROWS X 40 COLUMNS) |

Thus, it is apparent that there has been provided, in accordance with the invention, an emergency telecommunications device for the disabled that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An emergency telecommunication system for the hearing impaired and for the speech impaired comprising:

means for simultaneously receiving normal voice communications and an incoming signal from any one of TDD, PC/M and telephone devices external to said system in Baudot format, ASCII format and DTMF tones, respectively;

means for continuously searching said receiving means to detect the presence of said incoming signals;

means for sequentially testing said detected signals to identify said respective signal format of said detected signals; and means for passing a detected Baudot format signal.

2. A system according to claim 1 further comprising means for varying the volume and amplification of said normal voice communication signal.

3. A system according to claim 1 further comprising:

means for passing a detected ASCII format signal;

means for passing a detected DTMF tone signal;

means for encoding said passed signals from said Baudot and ASCII formats;

means for storing said encoded signals; and means for graphically displaying said stored signal.

4. A system according to claim 3 further comprising means for transmitting outgoing signals prerecorded in said storing means in electronic and audio tone formats to at least one telephone number prerecorded in said storing means in response to respective keyboard commands from a keyboard internal to said system.

5. A system according to claim 4, said searching means further continuously searching said transmitting means to detect the presence of said keyboard commands.

6. A system according to claim 5, said searching means searching said receiving means and said transmitting means in a loop.

7. A system according to claim 5 further comprising means for sequentially testing said keyboard commands to identify said respective format thereof.

8. A system according to claim 7 further comprising means for addressing said at least one prerecorded telephone number.

9. A system according to claim 8 further comprising means for initiating transmission of said prerecorded outgoing signals in said identified respective format to said addressed prerecorded telephone numbers which respond to said address.

10. An emergency telecommunication system for the hearing impaired and for the speech impaired comprising:

an interface electrically connecting said emergency system to a telephone communication system;

a programmable gate array;

a keyboard connected to said programmable gate array;

a register connected to said programmable gate array for storing at least one telephone number of said telephone communication system;

a graphic display device connected to said programmable gate array and to said register;

means for receiving and transmitting signals in ASCII format;

means for receiving and transmitting signals in Baudot format;

means for receiving and transmitting DTMF signals;

means for receiving and transmitting normal voice communications simultaneously with one of said ASCII and Baudot format and DTMF signals;

means for selectively switching each of said receiving and transmitting means in independent receiving and transmitting modes into and out of connection between said interface and said programmable gate array; and computer means connected between said interface and said programmable gate array for:
    detecting incoming signals to said interface;
    distinguishing whether said incoming signals are in ASCII format, Baudot format or audio tone; and
    connecting said receiving mode of one of said receiving and transmitting means corresponding to said distinguished signal between said interface and said programmable gate array.

11. A system according to claim 10, said computer means further for permitting variation of the volume of said audio tone signals in response to operation of a selected pad on said keyboard.

12. A system according to claim 10, said computer means further for permitting display on said graphic display device of a visual message corresponding to said incoming signal.

13. A system according to claim 10, said storing means further for storing at least one outgoing message in electronic form and in audio tone, said computer means further for:

initiating address of said at least one telephone number stored in said register in response to operation of a selected second pad of said keyboard;

initiating transmission of said at least one message in electronic form and audio tone in response to operation of a selected third and fourth pad respectively of said keyboard to a telephone number responding to said address.

14. A system according to claim 13, said computer means further for permitting change of said at least one electronic message stored in said register by operation of said keyboard.

15. A system according to claim 13, said computer means further for permitting change of said at least one audio tone message stored in said register by operation of a telephone connected to said audio tone receiving and transmitting means.

16. A system according to claim 13, said computer means further for permitting alpha numeric display by said graphic display device of signals received at said interface by operation of keyboards in said telephone system.

17. A method for the hearing impaired and for the speech impaired to transmit and receive emergency telecommunication messages comprising:

receiving incoming signals from remote devices in normal voice communication and simultaneously in any one of Baudot format, ASCII format and DTMF tones;

searching to detect the presence of said received signals;

testing said detected signals to identify said respective signal format of said detected signals;

passing said detected signal to a corresponding Baudot, ASCII or DTMF tone device;

encoding said passed signals in said Baudot and ASCII devices;

storing said encoded signals; and graphically displaying said stored signals.

18. A method according to claim 17 further comprising the step of varying the volume and amplification of said passed audio tone signal by operation of a preselected keypad of a local keyboard.

19. A method according to claim 17, said searching step further comprising continuously searching to detect the presence of keyboard commands from a local keyboard to transmit outgoing signals prerecorded in electronic and audio tone formats to at least one prerecorded telephone number.

20. A method according to claim 19 further comprising the steps of:

sequentially testing said keyboard commands to identify said respective format required thereby;

addressing said at least one prerecorded telephone number; and initiating transmission of said prerecorded outgoing signals in said identified respective format to said addressed prerecorded telephone numbers which respond to said address.

\* \* \* \* \*